United States Patent
Potter et al.

(10) Patent No.: US 8,719,538 B2
(45) Date of Patent: May 6, 2014

(54) METHODS AND SYSTEM FOR ENSURING MEMORY DEVICE INTEGRITY

(75) Inventors: Timothy Steven Potter, Bradenton, FL (US); Donald Becker, Bradenton, FL (US); Bruce Montgomery, Jr., Venice, FL (US)

(73) Assignee: UTC Fire & Security Americas Corporation, Inc., Bradenton, FL (US)

( * ) Notice: Subject to any disclaimer, the term of this patent is extended or adjusted under 35 U.S.C. 154(b) by 728 days.

(21) Appl. No.: 12/961,097

(22) Filed: Dec. 6, 2010

(65) Prior Publication Data

US 2012/0144151 A1 Jun. 7, 2012

(51) Int. Cl.
*G06F 12/00* (2006.01)
*G06F 13/00* (2006.01)

(52) U.S. Cl.
USPC ........... 711/170; 711/100; 711/154; 711/163; 711/172

(58) Field of Classification Search
USPC ........................... 711/100, 154, 162, 170, 172
See application file for complete search history.

(56) References Cited

U.S. PATENT DOCUMENTS

| 6,026,401 A * | 2/2000 | Brealey et al. ........................ 1/1 |
| 7,421,562 B2 | 9/2008 | Bhatt et al. |
| 2008/0196043 A1 | 8/2008 | Feinleib et al. |

\* cited by examiner

*Primary Examiner* — Tuan Thai
(74) *Attorney, Agent, or Firm* — Cantor Colburn LLP

(57) ABSTRACT

A method for protecting memory segments of a memory device is provided. The method includes receiving, by a processor coupled to the memory device, a request to allocate memory from an application, being executed by the processor, wherein the request includes a requested memory size and allocating, by the processor, a portion of memory having a size greater than the requested memory size. The method also includes creating, by the processor, a permitted read counter associated with the allocated portion of memory, wherein the permitted read counter is initialized to an initial value, and determining, by the processor, whether access to the memory segment is permitted using the permitted read counter. A system for protecting memory segments of a memory device is also disclosed.

20 Claims, 5 Drawing Sheets

METHODS AND SYSTEM FOR ENSURING MEMORY DEVICE INTEGRITY

BACKGROUND OF THE INVENTION

1. Field of the Invention

The embodiments described herein relate generally to verifying memory device integrity and, more particularly, to memory verification in an online computing device.

2. Description of Related Art

It is known to use checksum-based systems to verify the integrity of computer memory in limited scenarios. For example, error-correcting code (ECC) random access memory (RAM) detects memory errors but performs such error detection only as specific portions of the memory are accessed. It is also known to verify memory integrity in an offline mode, such as by executing a memory test utility in place of a conventional operating system.

However, existing systems and methods do not provide for continuous memory protection while a computer is online, executing one or more application programs within a demand paged operating system. Especially in computing devices where high reliability over an extended period is required, protection of the data stored within memory of the device is essential. For example, some high-reliability systems operate for months or years with little activity but are expected to function flawlessly in an emergency.

BRIEF SUMMARY OF THE INVENTION

In one aspect, a method for protecting memory segments of a memory device is provided. The method includes receiving, by a processor coupled to the memory device, a request to allocate memory from an application, being executed by the processor, wherein the request includes a requested memory size and allocating, by the processor, a portion of memory having a size greater than the requested memory size. The method also includes creating, by the processor, a permitted read counter associated with the allocated portion of memory, wherein the permitted read counter is initialized to an initial value, and determining, by the processor, whether access to the memory segment is permitted using the permitted read counter. A system for protecting memory segments of a memory device is also disclosed.

In another aspect, a system for protecting memory segments of a memory device is provided. The system includes a memory device comprising a plurality of memory locations and a processor coupled to the memory device, the processor programmed to receive a request to allocate memory from an application, being executed by the processor, wherein the request includes a requested memory size and allocate a portion of memory having a size greater than the requested memory size. The processor is also programmed to create a permitted read counter associated with the allocated portion of memory, wherein the permitted read counter is initialized to an initial value and determine whether access to the memory segment is permitted using the permitted read counter.

In yet another aspect, one or more computer-readable storage media having computer-executable components for protecting memory segments of a memory device are provided. The components include a control component that when executed by the at least one processor causes the at least one processor to receive a request to allocate memory from an application, being executed by the processor, wherein the request includes a requested memory size and allocate a portion of memory having a size greater than the requested memory size. The control component that when executed by the at least one processor also causes the at least one processor to create a permitted read counter associated with the allocated portion of memory, wherein the permitted read counter is initialized to an initial value and determine whether access to the memory segment is permitted using the permitted read counter.

BRIEF DESCRIPTION OF THE SEVERAL VIEWS OF THE DRAWINGS

FIG. 1 is a block diagram of a system with a computing device having a memory device.

FIG. 2 is a flowchart of an exemplary method for protecting memory segments of the memory device shown in FIG. 1.

FIG. 3 is a block diagram of memory blocks within the memory device shown in FIG. 1.

FIG. 4 is a flowchart of an exemplary method for initializing a portion of memory shown in FIG. 3.

FIG. 5 is block diagram of a system including a monitoring computing device coupled in communication with a plurality of monitored computing devices via a network.

DETAILED DESCRIPTION OF THE INVENTION

Embodiments of the systems and methods described herein facilitate continuously verifying memory device integrity within an online computing device. While some embodiments are described in connection with pages of memory mapped to files within a storage device, the embodiments provided herein are operable with any form of memory device. Moreover, the term "file" is used herein to include, without limitation, any collection of non-volatile information, such as an executable application, an operating system image and/or object, a dynamically linked shared code library, and/or fixed parameter data, whether local or remote to a computing device, suitable for use with the methods described herein.

Furthermore, such embodiments facilitate continuous memory device verification without intercepting write operations to the memory device and without direct modification to executable instructions of an operating system (OS) kernel. In the exemplary embodiment, a Linux OS is used, however any OS may be used to allow the system to function as described herein. For example, at least some of the operations described herein may be executed by a loadable kernel module that interacts with an operating system kernel and/or by a utility application that executes in "userspace" (i.e., with privileges assigned to a user of the computing device).

A technical effect of the systems and methods described herein may include one or more of the following: (a) initializing a portion of memory; (b) receiving a request to access the initialized portion of memory; (c) determining whether the request to access is a read or write request; and (d) protecting the data by only allowing one concurrent write and preventing any reads of the data during the write to prevent data corruption.

Figure 1:
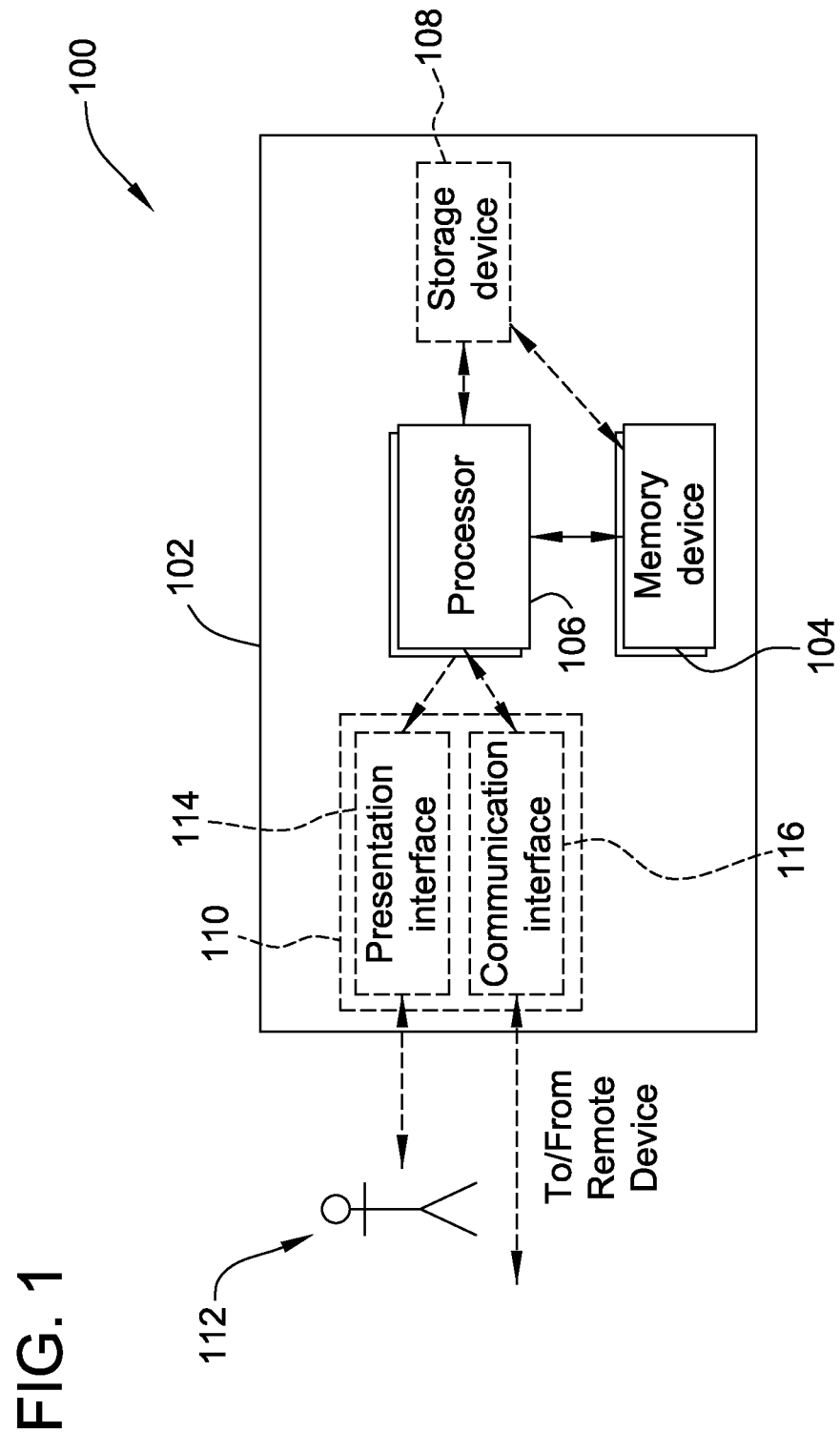
FIGS. 1-5 show exemplary embodiments of the systems and methods described herein.

FIG. 1 is a block diagram of a system 100 with a computing device 102. Computing device 102 includes a memory device 104 and, coupled to memory device 104, a processor 106 for executing instructions. In some embodiments, executable instructions are stored in memory device 104. Computing device 102 is configurable to perform one or more operations described herein by programming processor 106. For example, processor 106 may be programmed by encoding an operation as one or more executable instructions and providing the executable instructions in memory device 104. Processor 106 may include one or more processing units (e.g., in a multi-core configuration).

Memory device 104 is one or more devices allowing information such as executable instructions and/or other data to be stored and retrieved. Memory device 104 may include one or more computer readable media, such as, but not limited to, dynamic random access memory (DRAM) and/or static random access memory (SRAM).

Computing device 102 may also include a storage device 108. Like memory device 104, storage device 108 allows data to be stored and retrieved. Storage device 108 is coupled to processor 106 and, optionally, to memory device 104. For example, computing device 102 may provide direct memory access (DMA) between storage device 108 and memory device 104. Storage device 108 may include one or more computer readable media, such as, but not limited to, a solid state disk, a hard disk, battery backed SRAM, and/or a flash memory device. Memory device 104 and/or storage device 108 may be configured to store, without limitation, executable instructions corresponding to an operating system (OS) (e.g., an OS kernel and/or a kernel module), executable instructions corresponding to an application program, configuration data, program data, a dynamically linked shared code library, and/or any other type of data. Storage device 108 may have a larger memory capacity than a memory capacity of memory device 104.

In some embodiments, memory device 104 is configured to store a copy of at least a portion of data stored within storage device 108. For example, memory device 104 may be configured to store a copy of executable instructions stored within storage device 108, and processor 106 may be configured to access and execute the executable instructions from memory device 104.

Computing device 102 also includes at least one notification interface 110 configured to interact with a user 112 and/or a remote device (not shown in FIG. 1). In some embodiments, notification interface 110 includes a presentation interface 114 coupled to processor 106. Presentation interface 114 is configured to present information, such as a verification failure and/or a verification success, to user 112. For example, presentation interface 114 may include a display adapter (not shown in FIG. 1), which is configured to be coupled to a display device, such as a light emitting diode (LED) indicator, a cathode ray tube (CRT), a liquid crystal display (LCD), an organic LED (OLED) display, and/or an "electronic ink" display. In some embodiments, presentation interface 114 includes one or more display devices.

In addition, or alternatively, presentation interface 114 may include an audio adapter (not shown in FIG. 1), which is configured to be coupled to an audio device, such as a loudspeaker. In some embodiments, presentation interface 114 includes one or more audio devices.

In some embodiments, notification interface 110 includes a communication interface 116 coupled to processor 106. Communication interface 116 is configured to be coupled in communication with a remote device, such as another computing device 102. For example, communication interface 116 may include, without limitation, a wired network adapter, a wireless network adapter, and/or a mobile telecommunications adapter.

Figure 2:
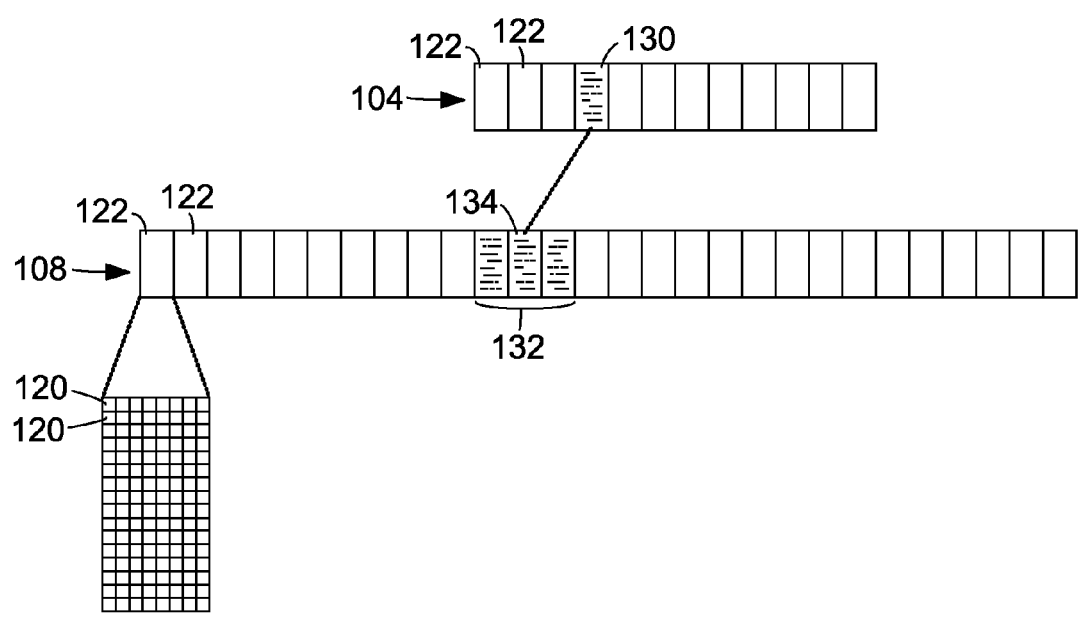

FIG. 2 is a block diagram of data within memory device 104 (shown in FIG. 1) and storage device 108. Memory device 104 and storage device 108 each include a plurality of memory locations 120. For example, each memory location 120 may correspond to one byte of data within memory device 104 and/or storage device 108. Multiple memory locations 120 are organized into memory blocks 122. For example, in memory device 104, a memory block 122 may be referred to as a portion or a "page" of memory. In one embodiment, a page of memory corresponds to 4096 memory locations 120, or four kilobytes (4 kB), although other page sizes are also contemplated. Memory blocks 122 corresponding to all memory locations 120 within memory device 104 may be utilized.

In the exemplary embodiment, a portion of memory 130 is being utilized. In some embodiments, memory portion 130 is a page of virtual memory corresponding to one or more memory locations 120 within memory device 104. In addition, or alternatively, one or more memory blocks 122 correspond to a single file 132. In one embodiment, memory portion 130 represents a portion 134 of file 132. The remainder of file 132 is also stored within storage device 108 but is not copied into memory device 104.

Figure 3:
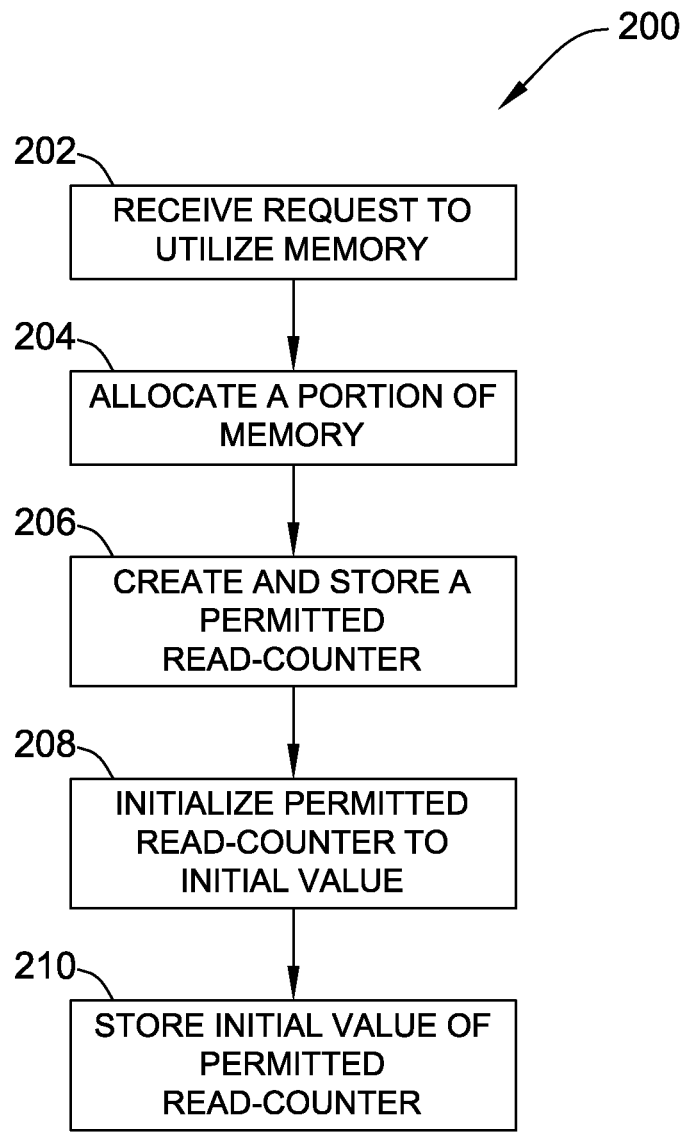

FIG. 3 is a flowchart of an exemplary method 200 for initializing memory portion 130 (shown in FIG. 2). In the exemplary embodiment, a request to utilize memory portion 130, from an application being executed by processor 106 (shown in FIG. 1), is received 202. In response to request 202, processor 106 allocates 204 memory portion 130 to be larger than requested 202 by the application. Alternatively, processor 106 allocates 204 a portion of memory equal to the size requested 202. Processor 106 then creates 206 a permitted read counter associated with memory portion 130 that has been allocated 204 in response to request 202. In the exemplary embodiment, the permitted read counter is a semaphore and is stored within the allocated memory portion 130, however, the permitted read counter may be any permitted read counter and may be stored anywhere that allows the current system to function as described herein. When the read counter is created 206, processor 106 initializes 208 the permitted read counter to an initial value.

In an exemplary embodiment, the initial value of the read counter is set to a value that indicates memory portion 130 is not being accessed. In the exemplary embodiment, permitted read counter may be configured to decrement from the initial value to indicate memory portion 130 is being accessed. For example, the initial value may be set to 10 and decremented to 0 allowing 10 concurrent accesses of memory portion 130. Alternatively, the permitted read counter may be configured to increment to reflect memory portion 130 is being accessed. For example, the initial value of the permitted read counter may be set to 0 and incremented to 2 reflecting memory portion 130 is being accessed by two different sources concurrently. The permitted read counter may be configured to allow unlimited reads or may be configured to allow a predetermined number of concurrent reads. After permitted read counter is initialized 208 to the initial value, in the exemplary embodiment, the initial value is stored 210, by processor 106 in the allocated 204 memory portion 130. Alternatively, the initial value may be stored anywhere that allows the current system to function as described herein.

Figure 4:
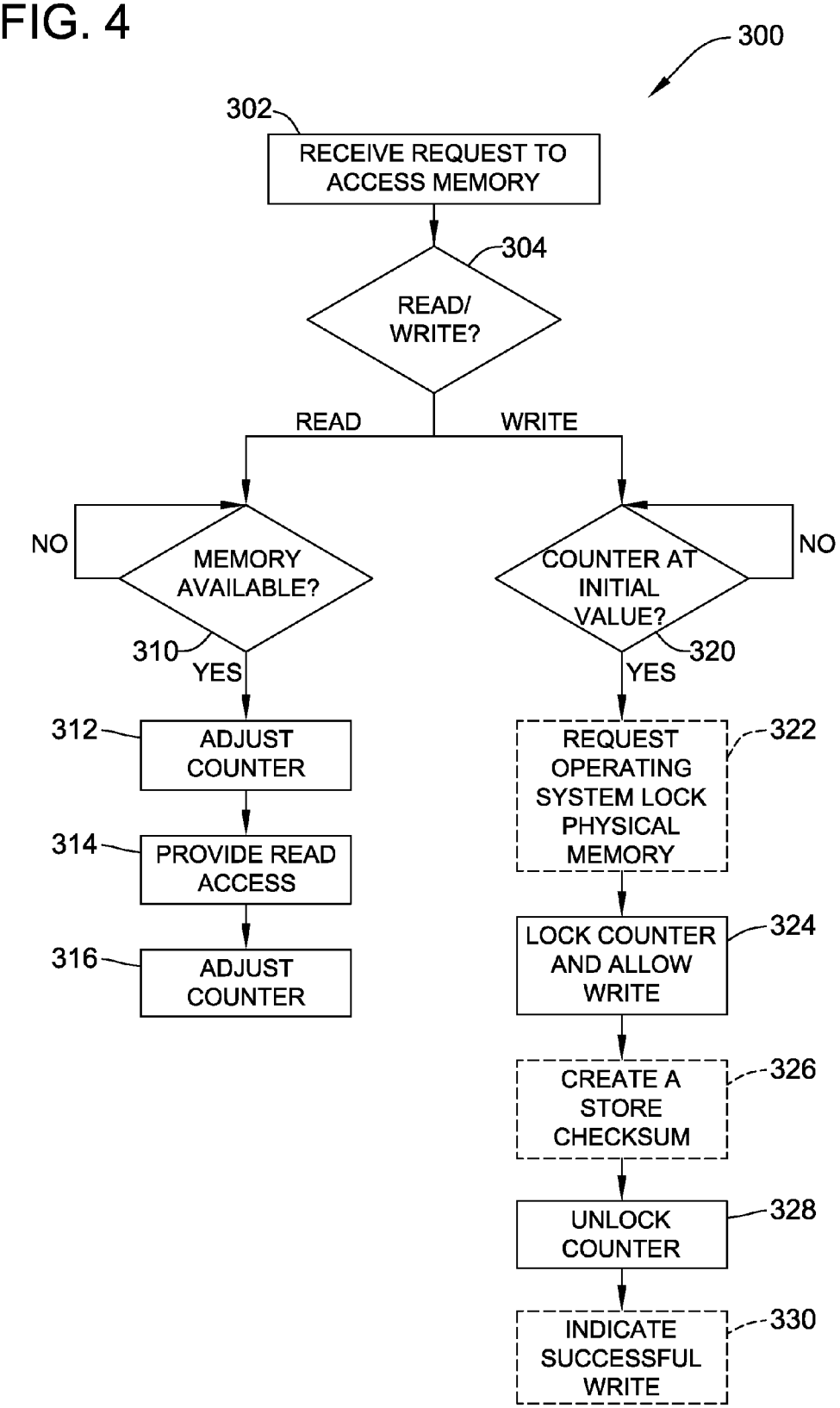

FIG. 4 is a flowchart of an exemplary method 300 for protecting memory segments of a memory device 104 (shown in FIG. 1) and may be initiated after method 200 for initializing memory portion 130 (shown in FIG. 2) is completed. Method 300 includes receiving 302 a request from an application being executed by processor 106, the request to access (e.g. read/write) memory portion 130 within memory device 104. In the exemplary embodiment, processor 106 determines 304 whether the request 302 to access memory portion 130 is a read or write request. In one embodiment, the request 302 is a read request and processor 106 determines 310 whether the allocated memory portion 130 is available for a read. If the permitted read counter is at a maximum number of permitted reads, processor 106 waits until the permitted read counter is available for a read. When memory portion 130 is available for read access, the permitted read counter is adjusted 312 to reflect the read and access to memory portion 130 is provided 314. As described above, the permitted read counter may be decremented or incremented to reflect an access. When the read of memory portion 130 has finished, the read counter is adjusted 316 accordingly.

In another embodiment, request 302 is a write request and processor 106 determines 320 whether the permitted read counter is equal to the initial value, reflecting that memory portion 130 is not being accessed. If the permitted read counter is not equal to the initial value, processor 106 waits until the counter is equal to the initial value. When the permitted read counter is equal to the initial value, in one embodiment, processor requests 322 the operating system lock the physical memory associated with memory portion 130 to ensure the write is the only access provided. In the exemplary embodiment, processor 106 locks 324 the permitted read counter to restrict access to memory portion 130 and permits a write. In one embodiment, processor 106 creates and stores 326 a checksum at the end of the write to verify the integrity of the data at a later time. For example, processor 106 may perform a checksum of memory portion 130 and compare the value against previous checksums to ensure the data has not been altered or corrupted. Processor 106 then unlocks 328 the permitted read counter allowing the permitted read counter to grant access to memory portion 130. In some embodiments, method 300 tracks successful writes of memory portion 130. If memory portion 130 is written to, a write success is indicated 330.

Some embodiments facilitate continuous access of one or more memory blocks 122 of memory device 104. For example, method 300 may be repeated continuously, periodically, or according to any suitable timing. Prior to determining 304 whether the request 302 to access memory portion 130 is a read or write request, method 300 may include delaying or sleeping for a short period, as described above.

Figure 5:
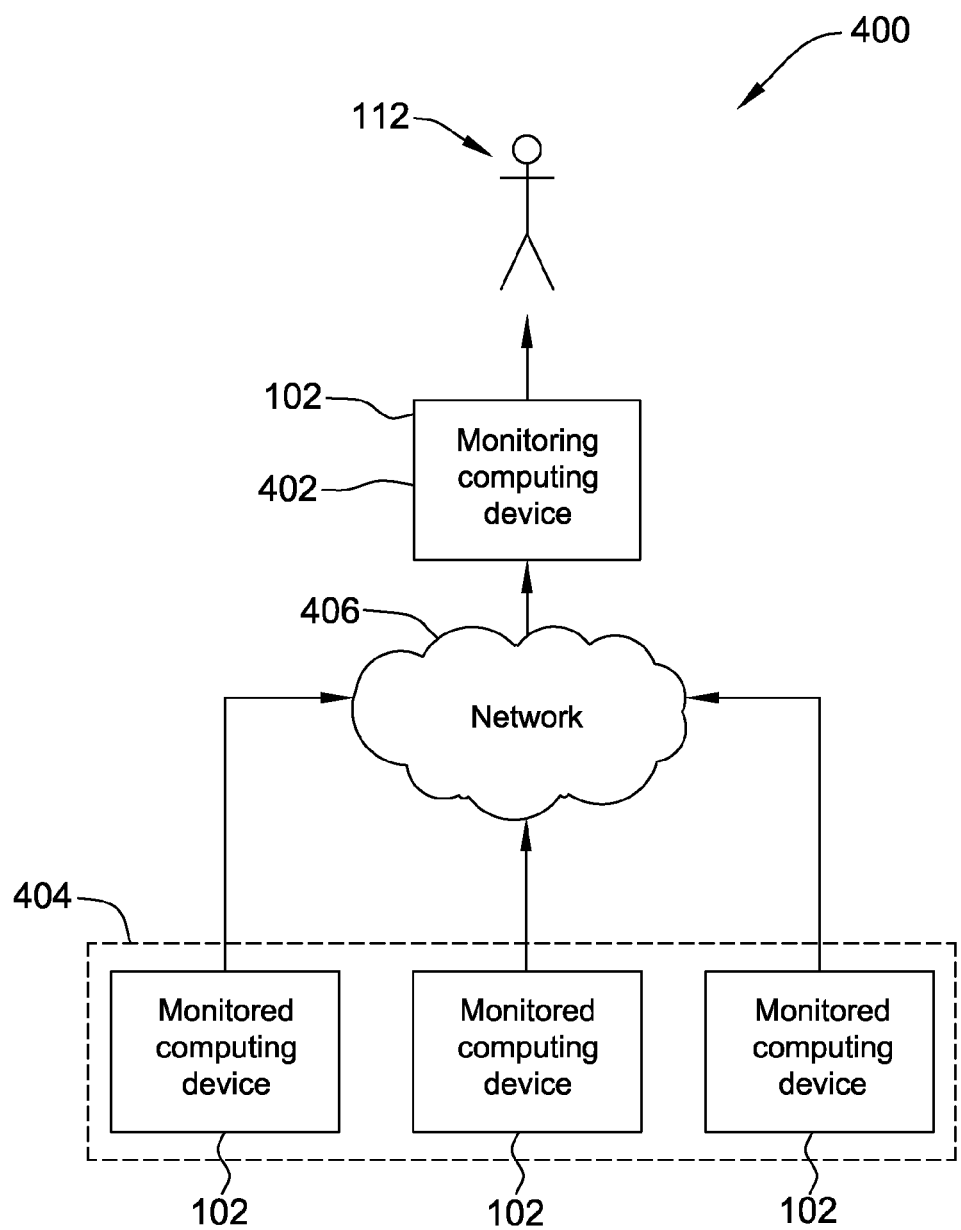

FIG. 5 is a block diagram of a system 400 including a monitoring computing device 402 coupled in communication with a plurality of monitored computing devices 404 via a network 406. For example, monitoring computing device 404 and monitored computing devices 410 may be coupled to network 406 via communication interfaces 116 (shown in FIG. 1). Network 406 may include, without limitation, the Internet, a local area network (LAN), a wide area network (WAN), a wireless LAN (WLAN), a mesh network, and/or a virtual private network (VPN).

In the exemplary embodiment, monitored computing devices 410 are configured to transmit verification failure messages and/or verification success messages to monitoring computing device 402. Monitoring computing device 402 is configured to receive verification failure messages and/or verification success messages and to indicate corresponding verification failures and/or verification successes, respectively, to user 112 via presentation interface 114 (shown in FIG. 1). Such an embodiment facilitates remote monitoring of a plurality of computing devices 102.

Exemplary embodiments of methods, systems, and computer-readable storage media for use in implementing a memory verification system are described above in detail. The methods, systems, and storage media are not limited to the specific embodiments described herein but, rather, operations of the methods and/or components of the system may be utilized independently and separately from other operations and/or components described herein. Further, the described operations and/or components may also be defined in, or used in combination with, other systems, methods, and/or storage media, and are not limited to practice with only the methods, systems, and storage media as described herein.

Computing devices, such as those described herein, include at least one processor or processing unit and a system memory. The computing device typically has at least some form of computer readable media. By way of example and not limitation, computer readable media include computer storage media and communication media. Computer storage media include volatile and nonvolatile, removable and non-removable physical media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

The methods described herein may be encoded as executable instructions embodied in a computer readable medium, including, without limitation, a computer storage medium, a storage device, and/or a memory device. Such instructions, when executed by a processor, cause the processor to perform at least a portion of the methods described herein.

Although the present invention is described in connection with an exemplary memory verification system environment, embodiments of the invention are operational with numerous other general purpose or special purpose memory verification system environments or configurations. The memory verification system environment is not intended to suggest any limitation as to the scope of use or functionality of any aspect of the invention. Moreover, the memory verification system environment should not be interpreted as having any dependency or requirement relating to any one or combination of components illustrated in the exemplary operating environment. Examples of well known memory verification systems, environments, and/or configurations that may be suitable for use with the embodiments described herein include, but are not limited to, embedded computing devices, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments may be described in the general context of computer-executable instructions, such as program components or modules, executed by one or more computers or other devices. Aspects of the invention may be implemented with any number and organization of components or modules. For example, embodiments are not limited to the specific computer-executable instructions or the specific components or modules illustrated in the figures and described herein. Alternative embodiments may include different computer-executable instructions or components having more or less functionality than illustrated and described herein.

The order of execution or performance of the operations in the embodiments illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the described embodiments.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for protecting memory segments of a memory device, the method comprising:
   receiving, by a processor coupled to the memory device, a request to allocate memory from an application being executed by the processor wherein the request includes a requested memory size;
   allocating, by the processor, a portion of memory having a size greater than the requested memory size;
   creating, by the processor, a permitted read counter associated with the allocated portion of memory, wherein the permitted read counter is initialized to an initial value, the permitted read counter having a value that is adjusted upon a read operation to the memory; and
   determining, by the processor, whether access to the memory segment is permitted using the permitted read counter.

2. A method in accordance with claim 1, wherein allocating, by the processor, a portion of memory greater than the requested memory size further comprises requesting, from the operating system, a portion of memory greater than the requested memory size.

3. A method in accordance with claim 1, wherein creating, by the processor, a permitted read counter further comprises creating, by the processor, a semaphore.

4. A method for protecting memory segments of a memory device, the method comprising:
   receiving, by a processor coupled to the memory device, a request to allocate memory from an application being executed by the processor wherein the request includes a requested memory size;
   allocating, by the processor, a portion of memory having a size greater than the requested memory size;
   creating, by the processor, a permitted read counter associated with the allocated portion of memory, wherein the permitted read counter is initialized to an initial value; and
   determining, by the processor, whether access to the memory segment is permitted using the permitted read counter;
   wherein determining, by the processor, whether access to the memory segment is permitted further comprises allowing a request to write to the memory segment when the permitted read counter is equal to the initial value.

5. A method in accordance with claim 4, further comprising, locking the permitted read counter to prevent a read of the memory segment.

6. A method for protecting memory segments of a memory device, the method comprising:
   receiving, by a processor coupled to the memory device, a request to allocate memory from an application being executed by the processor wherein the request includes a requested memory size;
   allocating, by the processor, a portion of memory having a size greater than the requested memory size;
   creating, by the processor, a permitted read counter associated with the allocated portion of memory, wherein the permitted read counter is initialized to an initial value; and
   determining, by the processor, whether access to the memory segment is permitted using the permitted read counter;
   wherein determining, by the processor, whether access to the memory segment is permitted further comprises allowing a request to read the memory segment when the permitted read counter is less than the maximum read value.

7. A method in accordance with claim 6, further comprising, at least one of decrementing and incrementing the permitted read counter in when the request to read is allowed.

8. A system for protecting memory segments of a memory device, the system comprising:
   a memory device comprising a plurality of memory locations; and
   a processor coupled to the memory device, the processor programmed to:
   receive a request to allocate memory from an application, being executed by the processor, wherein the request includes a requested memory size;
   allocate a portion of memory having a size greater than the requested memory size;
   create a permitted read counter associated with the allocated portion of memory, wherein the permitted read counter is initialized to an initial value, the permitted read counter having a value that is adjusted upon a read operation to the memory; and
   determine whether access to the memory segment is permitted using the permitted read counter.

9. A system in accordance with claim 8, wherein the processor programmed to allocate a portion of memory having a size greater than the requested memory size, further allocates, from the operating system, a portion of memory greater than the requested memory size.

10. A system in accordance with claim 8, wherein the processor programmed to create a permitted read counter associated with the allocated portion of memory creates a semaphore associated with the allocated portion of memory.

11. A system for protecting memory segments of a memory device, the system comprising:
    a memory device comprising a plurality of memory locations; and
    a processor coupled to the memory device, the processor programmed to:
    receive are request to allocate memory from an application being executed by the processor, wherein the request includes a requested memory size;
    allocate a portion of memory having a size greater than the requested memory size;
    create a permitted read counter associated with the allocated portion of memory, wherein the permitted read counter is initialized to an initial value; and determine whether access to the memory segment is permitted using the permitted read counter;

wherein the processor programmed to determine whether access to the memory segment is permitted is further programmed to allow a request to write to the memory segment when the permitted read counter is equal to the initial value.

12. A system in accordance with claim 11, wherein the processor is further programmed to lock the permitted read counter to prevent a read of the memory segment.

13. A system for protecting memory segments of a memory device, the system comprising:
  a memory device comprising a plurality of memory locations; and
  a processor coupled to the memory device, the processor programmed to:
  receive a request to allocate memory from an application, being executed by the processor, wherein the request includes a requested memory size;
  allocate a portion of memory having a size greater than the requested memory size;
  create a permitted read counter associated with the allocated portion of memory, wherein the permitted read counter is initialized to an initial value; and
  determine whether access to the memory segment is permitted using the permitted read counter;
  wherein the processor programmed to determine whether access to the memory segment is permitted is further programmed to allow a request to read the memory segment when the permitted read counter is less than the maximum read value.

14. A system in accordance with claim 13, wherein the processor is further programmed to at least one of decrement and increment the permitted read counter in when the request to read is allowed.

15. One or more non-transitory computer-readable storage media having computer-executable components for protecting memory segments of a memory device, the components comprising:
  a control component that when executed by the at least one processor causes the at least one processor to:
  receive a request to allocate memory from an application, being executed by the processor, wherein the request includes a requested memory size;
  allocate a portion of memory having a size greater than the requested memory size;
  create a permitted read counter associated with the allocated portion of memory, wherein the permitted read counter is initialized to an initial value, the permitted read counter having a value that is adjusted upon a read operation to the memory; and
  determine whether access to the memory segment is permitted using the permitted read counter.

16. One or more computer-readable storage media in accordance with claim 15, wherein the control component, when executed by the at least one processor causes the at least one processor to allocate a portion of memory greater than the requested memory size.

17. One or more computer-readable storage media in accordance with claim 15, wherein the control component, when executed by the at least one processor causes the at least one processor to store the initial value associated with the permitted read counter in the allocated portion of memory.

18. One or more non-transitory computer-readable storage media having computer-executable components for protecting memory segments of memory device, the components comprising:
  a control component that when executed by the at least one processor causes the at least one processor to:
  receive a request to allocate memory from an application, being executed by the processor, wherein the request includes a requested memory size;
  allocate a portion of memory having a size greater than the requested memory size;
  create a permitted read counter associated with the allocated portion of memory, wherein the permitted read counter is initialized to an initial value; and
  determine whether access to the memory segment is permitted using the permitted read counter;
  wherein the control component, when executed by the at least one processor causes the at least one processor to determine whether access to the memory segment is permitted is further allows a request to read the memory segment when the permitted read counter is less than the maximum read value.

19. One or more non-transitory computer-readable storage media having computer-executable components for protecting memory segments of a memory device, the components comprising:
  a control component that when executed by the at least one processor causes the at least one processor to;
  receive a request to allocate memory from an application, being executed by the processor, wherein the request includes a requested memory size;
  allocate a portion of memory having a size greater than the requested memory size;
  create a permitted read counter associated with the allocated portion of memory, wherein the permitted read counter is initialized to an initial value; and
  determine whether access to the memory segment is permitted using the permitted read counter;
  wherein the control component, when executed by the at least one processor further causes the at least one processor to determine whether access to the memory segment is permitted further allows a request to read the memory segment when the permitted read counter is less than the maximum read value.

20. One or more computer-readable storage media in accordance with claim 19, wherein the control component when executed by the at least one processor further at least one of decrements and increments the permitted read counter in when the request to read is allowed.

* * * * *